(12) United States Patent
Doberschuetz

(10) Patent No.: US 9,511,754 B2
(45) Date of Patent: Dec. 6, 2016

(54) HYDRAULIC FLUID PUMP OF A VEHICLE BRAKE SYSTEM HAVING A DELIVERY MEANS

(75) Inventor: Christian Doberschuetz, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 1141 days.

(21) Appl. No.: 12/809,942

(22) PCT Filed: Nov. 12, 2008

(86) PCT No.: PCT/EP2008/065336
§ 371 (c)(1),
(2), (4) Date: Jul. 27, 2010

(87) PCT Pub. No.: WO2009/083323
PCT Pub. Date: Jul. 9, 2009

(65) Prior Publication Data
US 2010/0293938 A1    Nov. 25, 2010

(30) Foreign Application Priority Data
Dec. 21, 2007    (DE) .................. 10 2007 062 030

(51) Int. Cl.
| | | |
|---|---|---|
| F04B 49/00 | (2006.01) |
| B60T 8/40 | (2006.01) |
| F04B 23/10 | (2006.01) |
| B60T 17/02 | (2006.01) |
| F04B 23/04 | (2006.01) |
| F04B 49/08 | (2006.01) |
| F04B 49/12 | (2006.01) |
| F04B 49/16 | (2006.01) |

(52) U.S. Cl.
CPC .............. *B60T 8/4031* (2013.01); *B60T 17/02* (2013.01); *F04B 23/04* (2013.01); *F04B 23/10* (2013.01); *F04B 49/08* (2013.01); *F04B 49/12* (2013.01); *F04B 49/121* (2013.01); *F04B 49/16* (2013.01)

(58) Field of Classification Search
CPC .......... F04B 49/12; B60T 8/4077; B60T 17/02
USPC ............ 417/471, 437; 92/84, 129, 130, 60.5
See application file for complete search history.

(56) References Cited

U.S. PATENT DOCUMENTS

| | | | | |
|---|---|---|---|---|
| 443,860 | A | * | 12/1890 | MacDonald .................... 74/581 |
| 1,417,317 | A | * | 5/1922 | Griffin et al. ................. 417/539 |
| 3,004,810 | A | * | 10/1961 | King ................................ 92/84 |
| 3,038,312 | A | * | 6/1962 | Marsh ................. F16H 61/4096 418/25 |
| 3,756,666 | A | * | 9/1973 | Leiber ............................ 303/10 |
| 3,985,472 | A | * | 10/1976 | Virtue et al. .................. 417/216 |

(Continued)

FOREIGN PATENT DOCUMENTS

| | | |
|---|---|---|
| DE | 3635656 A1 | 4/1988 |
| DE | 3929500 A1 | 3/1991 |

(Continued)

*Primary Examiner* — Peter J Bertheaud
*Assistant Examiner* — Christopher Bobish
(74) *Attorney, Agent, or Firm* — Maginot, Moore & Beck LLP

(57) ABSTRACT

The invention is a hydraulic fluid pump of a vehicle brake system, which has a delivery device for delivering hydraulic fluid against a hydraulic counter-pressure prevailing in a section of the vehicle brake system. The hydraulic fluid pump further has a mechanism for modifying the volume delivered by the delivery device in accordance with the level of the hydraulic counter-pressure.

7 Claims, 2 Drawing Sheets

(56) References Cited

U.S. PATENT DOCUMENTS

| | | | |
|---|---|---|---|
| 4,382,485 A * | 5/1983 | Kirkham | 180/306 |
| 4,754,603 A * | 7/1988 | Rosman | B60K 6/12 |
| | | | 60/413 |
| 4,822,257 A * | 4/1989 | Olofsson | 417/389 |
| 5,004,403 A * | 4/1991 | Culbertson et al. | 417/53 |
| 5,044,891 A * | 9/1991 | Ozawa | 417/214 |
| 5,165,862 A * | 11/1992 | Lindblom | 417/216 |
| 5,775,881 A * | 7/1998 | Stich | 417/287 |
| 6,146,115 A | 11/2000 | Alaze | |
| 6,454,543 B1 * | 9/2002 | Beck | B60T 8/4022 |
| | | | 417/199.1 |
| 6,595,105 B2 * | 7/2003 | An et al. | 92/60 |
| 7,090,474 B2 * | 8/2006 | Lehrke et al. | 417/395 |
| 7,908,962 B2 * | 3/2011 | Kim et al. | 92/84 |
| 7,954,317 B2 * | 6/2011 | Bitter | F04B 23/10 |
| | | | 60/456 |
| 2002/0038547 A1 * | 4/2002 | Hansell et al. | 60/444 |
| 2007/0289442 A1 | 12/2007 | Waller et al. | |
| 2010/0322791 A1 * | 12/2010 | Wadsley et al. | 417/286 |

FOREIGN PATENT DOCUMENTS

| | | |
|---|---|---|
| DE | 4102364 A1 | 7/1992 |
| WO | 9923387 A1 | 5/1999 |

\* cited by examiner

HYDRAULIC FLUID PUMP OF A VEHICLE BRAKE SYSTEM HAVING A DELIVERY MEANS

CROSS-REFERENCE TO RELATED APPLICATION

This application is a 35 USC 371 application of PCT/EP2008/065336 filed on Nov. 12, 2008

BACKGROUND OF THE INVENTION

1. Field of the Invention

The invention relates to a hydraulic fluid pump of a vehicle brake system, having a delivery mechanism for delivering hydraulic fluid counter to a hydraulic counterpressure existing in a portion of the vehicle brake system. The invention also relates to a vehicle brake system having a hydraulic fluid pump of this kind.

2. Description of the Prior Art

Hydraulic fluid pumps of vehicle brake systems are known in which for delivering hydraulic fluid or brake fluid to the vehicle brake system, and particularly for returning the brake fluid from the vehicle brakes and/or for actively building up brake pressure, a plurality of reciprocating piston pumps are used as delivery mechanism. These reciprocating piston pumps are also called pump elements.

As a rule, the pump elements are driven via an electric motor, with an eccentric element seated on a drive shaft. Alternatively, cam drives or similar mechanisms are possible as well. Depending on the eccentricity of the eccentric element and on the diameter of the piston used in the pump element or reciprocating piston pump, the result is a constant delivery volume per revolution of the electric motor.

On the assumption of a complete filling of the pressure chamber at the pump element or the reciprocating piston pump, and ignoring the efficiencies, the result in all operating ranges of the hydraulic fluid pump is a linear relationship between the hydraulic load torque (pressure p) and electrical output (current intensity I, when the voltage U is constant). Because of this linear relationship, even though the hydraulic load torque in known hydraulic fluid pumps can be well set by means of simple regulation of the electric current intensity, such hydraulic fluid pumps do not operate optimally in all parts of the operating range.

OBJECT AND SUMMARY OF THE INVENTION

It is an object of the present invention to furnish a vehicle brake system having a hydraulic fluid pump, in which over wide parts of the operating range, a largely optimal pressure supply to the associated vehicle brake system is ensured.

According to the invention, a hydraulic fluid pump of a vehicle brake system, having a delivery mechanism for delivering hydraulic fluid counter to a hydraulic counterpressure existing in a portion of the vehicle brake system is created, in which a means for varying the delivery volume of the delivery means as a function of the magnitude of the hydraulic counterpressure is provided. The object is also attained according to the invention with a vehicle brake system having a hydraulic fluid pump embodied in this way according to the invention.

The version according to the invention is based on the recognition that in known vehicle brake systems, in conventional regulation situations, and especially on returning hydraulic fluid with the aid of the hydraulic fluid pump, essentially two design points are relevant for the hydraulic fluid supply:

In a first design point, as great as possible a hydraulic delivery output is intended to be furnished, at a low pressure level or a pressure level of 0 bar. With this thus great hydraulic delivery output, the pressure buildup dynamics are to be maximized, and the time for overcoming the ventilation clearance between the brake linings of the vehicle brake system and the associated brake disk is intended to be minimized. This function of conventional vehicle brake systems, in stabilization functions, is also called performance optimization.

In the second design point, a safer startup of the drive motor in return pumping operation in an antilock brake system (ABS) is intended to be ensured, even at maximum pressure at the master cylinder of the vehicle brake system. This means that the driver of the associated vehicle steps down hard on the associated brake pedal and thus generates a maximum brake pressure at the master cylinder, while the drive motor of the hydraulic fluid pump is still supposed to be aspirating hydraulic fluid from the vehicle brakes, in order to ensure the antilock function.

At the same time, the two aforementioned design points are not independent of one another for supplying hydraulic fluid to vehicle brakes of a vehicle brake system. Both the first and the second design point—as the invention has recognized—are affected by the geometric dimensions of the pump element and/or the eccentricity of the associated drive mechanism.

Thus an optimization in the direction of the first design point, and thus in the direction of a high hydraulic delivery output at a low pressure level, the result is simultaneously a comparatively high requisite electrical output, or a high motor startup torque for the return pumping mode in the antilock function. In other words, a high delivery output at a high pressure level is associated with the high delivery output, which is fundamentally to be provided, of the pump elements at a low pressure level.

To explain this relationship, FIG. 1 is appended here. FIG. 1, in the form of a graph, shows the pressure, generated by pump elements, plotted on an X axis in relation to a delivery output represented on the associated Y axis.

The above relationship, which is that a pump element of high delivery output at a low pressure level also has a comparatively high delivery output even at a high pressure level, is shown in FIG. 1 at line 10. Line 10 shows that there is a linear relationship between the hydraulic load torque (pressure) and the electrical output (delivery output) of the associated drive motor. A pump element that is optimized at a first design point 20 at low pressure for a high delivery output pumps at increasing pressure, as indicated by line 10, up to a point 30 at which there is still a comparatively high delivery output and thus a comparatively high regulating current intensity for the driving electric motor.

Optimizing the pump element in the direction of an only slight motor output or an only slight startup torque of the electric motor at high pressure results in FIG. 1 in the design point 40. However, as indicated by line 60, such a pump element, at a slight pressure, also leads to an only slight delivery output up to a point 50.

If conversely the functional demands of the vehicle brake system are better taken account of, and a hydraulic fluid pump were to be designed with regard to both design points 20 and 40, then conversely—as the invention has recognized—a relationship as represented in FIG. 1 by curve 70 is the goal.

The version according to the invention attains this optimized design curve by providing that in the hydraulic fluid pump of the invention, a means is provided for varying the delivery volume of the delivery mechanism as a function of the magnitude of the hydraulic counterpressure. As the delivery mechanism, a pump element or reciprocating piston pump in particular is provided, and the delivery volume is defined as the particular quantity of hydraulic fluid that the hydraulic fluid pump delivers into or aspirates from the associated vehicle brake system upon one revolution of the pump drive motor.

The version according to the invention creates an adaptation, suited to demand, of the hydraulic delivery output to the functional demands of the associated regulating system. These demands include in particular, as explained, a high delivery output at low counterpressures for fast vehicle stabilization, and a low delivery output at high counterpressures for safely performing the antilock function.

With the version according to the invention, the requisite electrical output of the drive motor of the hydraulic fluid pump can be minimized at the same time.

According to the invention, the delivery mechanism for delivering hydraulic fluid is preferably embodied with at least one delivery piston, which is displaceably supported in a cylinder and together with the cylinder defines a pressure chamber, whose volume is varied by the displacement of the delivery piston. The mechanism for varying the delivery volume is preferably embodied as a mechanism for (additionally) varying the volume of the pressure chamber as a function of the hydraulic counterpressure. In other words, the delivery piston, with a reciprocating motion that remains the same, delivers into a pressure chamber whose volume varies at the same time. In this advantageous version, in particular with increasing counterpressure, the resultant volume of the pressure chamber increases in comparison to the conventional situation, and as a result, from the increasing volume, the delivery piston can expel only a lesser amount of hydraulic fluid, even though the reciprocating motion remains the same. In particular, the volume of the pressure chamber increases when the delivery piston builds up pressure and a high counterpressure is thus applied. Conversely, if the counterpressure is slight, then upon expulsion of hydraulic fluid from the pressure chamber, its volume increases to a lesser extent or not at all, so that a greater amount of hydraulic fluid is accordingly expelled from the pressure chamber.

According to the invention, the means for varying the volume of the pressure chamber as a function of the hydraulic counterpressure is also preferably embodied as a means for varying the stroke course of the delivery piston as a function of the hydraulic counterpressure. In this way, according to the invention, with increasing counterpressure, the resultant stroke volume of the delivery piston is advantageously reduced, so that in comparison to the conventional system, the volume of the pressure chamber increases, and thus a lesser hydraulic delivery output is the result.

Preferably, the mechanism for varying the stroke course of the delivery piston is embodied by means of two piston parts, which are movable relative to one another.

Especially preferably, the mechanism for varying the delivery volume of the delivery mechanism is embodied with an elastic element, which can be tensed counter to the counterpressure of the hydraulic fluid. This elastic element of this kind is especially preferably used between the aforementioned piston parts of the delivery piston. By a suitable design of the elastic element, which is preferably embodied as a mechanical spring, an elastomer component, and/or a gas reservoir, it can be attained that at a defined counterpressure, no further delivery with the hydraulic fluid pump takes place, and thus even upon a further increase in the counterpressure, no increase in the load torque at the associated drive mechanism occurs. The direct result is that the requisite maximum startup torque of an associated electric motor is less, so that correspondingly, a lesser electrical output can also be installed.

Especially preferably, for each hydraulic brake circuit of the associated vehicle brake system, the use of at least two pump elements or reciprocating piston pumps is contemplated. At least one of the reciprocating piston pumps is embodied as a conventionally operating pump, with which then in operation, the functionally required volumetric flow can be attained even at high counterpressures. Thus on the one hand, the demands of the vehicle manufacturer for an overall reduced electrical load of the associated on-board electrical system can be met, while at the same time the hydraulic delivery output can be attained in a manner to suit demand.

BRIEF DESCRIPTION OF THE DRAWINGS

One exemplary embodiment of the version according to the invention is described in further detail below in conjunction with the appended schematic drawing, in which.

DESCRIPTION OF THE PREFERRED EMBODIMENTS

Figure 1:
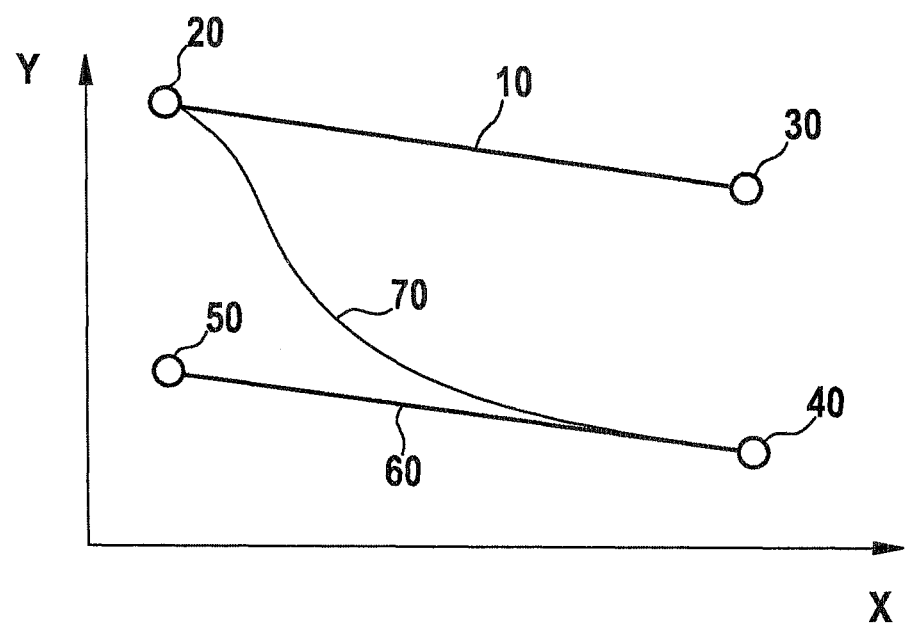
FIG. 1 shows a graph of the ratio of the delivery output and the counterpressure in conventional hydraulic fluid pumps and in a version according to the invention.

In FIG. 1, as already explained above, it is shown how with the version of the invention, a delivery volume of a delivery means of a hydraulic fluid pump, which delivery volume varies as a function of the magnitude of the hydraulic counterpressure, can be furnished to a hydraulic assembly in a manner to suit demand. In this respect, see the description of FIG. 1 above.

Figure 2:
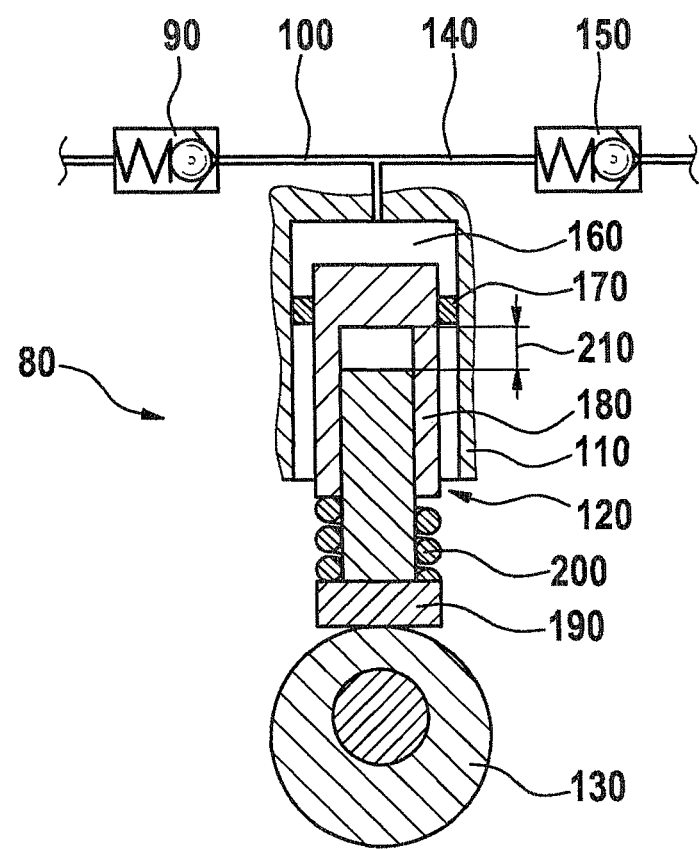
FIG. 2 is a highly simplified longitudinal section through an exemplary embodiment of a hydraulic fluid pump of the invention.

In FIG. 2, a hydraulic fluid pump 80 is shown, which as essential components includes an inlet valve 150, an inlet line 140, a cylinder 110 with a piston 120 disposed in it, an associated eccentric element drive 130, an outlet line 100, and an outlet valve 90. The inlet valve 150, the inlet line 140, and the outline line 100 together with the outlet valve 90 communicate in fluid-conducting fashion with a pressure chamber 160, formed by the cylinder 110 and the piston 120, in such a way that by a motion of the piston 120, hydraulic fluid (not shown) is aspirated into the pressure chamber 160 and pumped out of it again. For that purpose, the piston 120 is supported axially displaceably in the cylinder 110, and a high-pressure seal 170 is disposed between the outside of the piston 120 and the inside of the cylinder 110.

The piston 120 is formed in two parts of a first piston part 180 and a second piston part 190, which are displaceable relative to one another in the operative direction of the eccentric element drive 130 or in the axial direction of motion of the piston 120 and in the process are tensed by an elastic element 200, in the form of a helical spring, in the direction of the eccentric element drive 130 counter to one another and counter to the counterpressure in the pressure chamber 160. The piston part 190 can overcome a spring travel 210 relative to the piston part 180.

In operation of the eccentric element drive 130, the piston 120 (as in conventional hydraulic fluid pumps also) is moved in the axial direction and is offset relative to the cylinder 110. The volume in the pressure chamber 160 is increased and decreased in alternation, as a result of which hydraulic fluid is aspirated into the pressure chamber 160 through the inlet line 110 and subsequently pumped out of the pressure chamber 160 again through the outlet line 100.

Thus together with the cylinder 110 and the eccentric element drive 130, the piston 120 forms a delivery means for delivering hydraulic fluid counter to a hydraulic counterpressure existing in a portion of the vehicle brake system (in the present case, in the outlet line 100 and the outlet valve 90). As explained above, the piston 120 is embodied in two parts, and the piston parts 180 and 190 together with the elastic element 200 create a means for varying the delivery volume of this delivery means as a function of the magnitude of the hydraulic counterpressure.

The elastic element 200 disposed in the piston 120 varies the stroke course of the piston part 180 as a function of the existing counterpressure in the pressure chamber 160, so that with increasing counterpressure, the resultant stroke volume for the entire piston 120, and thus the hydraulic delivery output, are reduced. By means of a suitable design of the elastic element 200 and of the spring travel 210, it is attained that from a defined spring travel on, no further delivery of hydraulic fluid by the piston part 180 takes place, and thus even if the counterpressure increases further, no further increase in the load torque occurs. The direct result of this is that the requisite maximum startup torque of the eccentric element drive 130, and the electrical output required for this, can be reduced in comparison to conventional versions.

The functionally required volumetric flow in the vehicle brake system, or in the brake circuit associated with the hydraulic fluid pump 80, is ensured by means of a further hydraulic fluid pump (not shown) of conventional design. The associated vehicle brake system therefore preferably includes at least two hydraulic fluid pumps per brake circuit, or a total of at least four per entire hydraulic assembly.

The foregoing relates to the preferred exemplary embodiments of the invention, it being understood that other variants and embodiments thereof are possible within the spirit and scope of the invention, the latter being defined by the appended claims.

The invention claimed is:

1. A vehicle brake system, comprising:
   a first hydraulic pump including (i) a delivery means configured to deliver hydraulic fluid to a portion of the vehicle brake system counter to a hydraulic counterpressure existing in the portion of the vehicle brake system and (ii) a mechanism for varying a delivery volume of the delivery means as a function of a magnitude of the hydraulic counterpressure; and
   a second hydraulic pump configured to supply a required functional flow to the portion of the vehicle brake system regardless of the hydraulic counterpressure in the portion of the vehicle brake system,
   wherein the delivery means is embodied with at least one delivery piston, which is supported displaceably in a cylinder and together with the cylinder defines a pressure chamber, whose stroke volume is variable by displacement of the delivery piston, and further the mechanism for varying the delivery volume of the delivery means is embodied as a mechanism for varying the stroke volume of the pressure chamber as a function of the hydraulic counterpressure,
   wherein the mechanism for varying the volume of the pressure chamber as a function of the hydraulic counterpressure is embodied as a mechanism for varying a stroke course of the delivery piston as a function of the hydraulic counterpressure, and
   wherein the mechanism for varying the stroke course of the delivery piston is embodied by means of a first piston part and a second piston part, which are movable relative to one another.

2. The vehicle brake system as defined by claim 1, wherein the mechanism for varying the delivery volume of the delivery means includes an elastic element configured to be tensed counter to the hydraulic counterpressure.

3. The vehicle brake system as defined by claim 2, wherein the elastic element is embodied with a mechanical spring.

4. The vehicle brake system as defined by claim 1, wherein the mechanism for varying the delivery volume of the delivery means includes an elastic element disposed on the second piston part outside of and in contact with the first piston part.

5. The vehicle brake system as defined by claim 1, wherein the portion of the vehicle brake system is in a brake circuit of the vehicle brake system.

6. The vehicle brake system as defined by claim 1, wherein the second hydraulic pump is of conventional design.

7. The vehicle brake system as defined by claim 1, wherein the mechanism for varying the delivery volume of the delivery means is configured to increase the flow of the first hydraulic pump in response to an decrease in the hydraulic counterpressure, and to decrease the flow of the first hydraulic pump in response to an increase in the hydraulic counterpressure.

* * * * *